(12) United States Patent
Chanda

(10) Patent No.: US 10,518,757 B2
(45) Date of Patent: Dec. 31, 2019

(54) METHOD AND SYSTEM FOR DETERMINING VEHICLE SPEED USING VERTICAL AND LONGITUDINAL ACCELERATION SENSORS

(71) Applicant: Robert Bosch GmbH, Stuttgart (DE)

(72) Inventor: Hirak Chanda, Troy, MI (US)

(73) Assignee: Robert Bosch GbmH, Stuttgart (DE)

( * ) Notice: Subject to any disclaimer, the term of this patent is extended or adjusted under 35 U.S.C. 154(b) by 342 days.

(21) Appl. No.: 15/389,641

(22) Filed: Dec. 23, 2016

(65) Prior Publication Data

US 2018/0178767 A1 Jun. 28, 2018

(51) Int. Cl.
*B60T 8/17* (2006.01)
*B60R 16/023* (2006.01)
*B60W 40/076* (2012.01)
*G01C 21/16* (2006.01)

(52) U.S. Cl.
CPC ............ *B60T 8/17* (2013.01); *B60R 16/0232* (2013.01); *B60W 40/076* (2013.01); *G01C 21/16* (2013.01)

(58) Field of Classification Search
None
See application file for complete search history.

(56) References Cited

U.S. PATENT DOCUMENTS

| | | | |
|---|---|---|---|
| 7,962,310 B2 | 6/2011 | Guegan et al. | |
| 8,370,013 B2 | 2/2013 | Linda et al. | |
| 9,174,534 B2 | 11/2015 | Gao et al. | |
| 2008/0059021 A1* | 3/2008 | Lu | B60G 17/0195 701/36 |
| 2008/0065305 A1* | 3/2008 | Hattori | B60K 17/344 701/70 |
| 2008/0071452 A1 | 3/2008 | Tan et al. | |
| 2008/0319683 A1 | 12/2008 | Ogawa | |
| 2011/0295457 A1 | 12/2011 | Linda et al. | |
| 2014/0358397 A1* | 12/2014 | Gao | B60K 28/16 701/90 |
| 2018/0273045 A1* | 9/2018 | Herrera | B60W 40/11 |

FOREIGN PATENT DOCUMENTS

| | | |
|---|---|---|
| DE | 19502384 A1 | 8/1995 |
| DE | 19527531 A1 | 2/1996 |
| DE | 102013205245 A1 | 9/2014 |
| EP | 0496252 A2 | 7/1992 |

\* cited by examiner

*Primary Examiner* — David P. Merlino
(74) *Attorney, Agent, or Firm* — Michael Best & Friedrich LLP

(57) ABSTRACT

System and method for determining vehicle speed of a wheel. The system including an electronic stability controller, an occupancy restraint controller, and an actuation controller coupled to a communication bus. The electronic stability controller including a wheel speed sensor to determine a first vehicle speed. The occupancy restraint controller including a vertical acceleration sensor to sense a vertical acceleration of the vehicle and a longitudinal acceleration sensor to sense a longitudinal acceleration of the vehicle. The actuation controller configured to determine a second vehicle speed using the vertical acceleration and the longitudinal acceleration of the vehicle. validate the second vehicle speed when the difference between the first vehicle speed and the second vehicle speed is less than a threshold, and use the first vehicle speed when the difference between the first vehicle and the second vehicle speed is greater than a threshold.

5 Claims, 3 Drawing Sheets

METHOD AND SYSTEM FOR DETERMINING VEHICLE SPEED USING VERTICAL AND LONGITUDINAL ACCELERATION SENSORS

BACKGROUND OF THE INVENTION

The present invention relates to method and system for vehicle speed estimation using vertical and longitudinal acceleration sensors.

SUMMARY

Methods and systems described herein provide for vehicle speed calculations based on acceleration input can be used to control the vehicle to a safe spot in the event of a catastrophic failure of the electronic stability controller or a brake controller module.

One embodiment provides a system for determining vehicle speed of a vehicle. The system includes an electronic stability controller, an occupancy restraint controller, and an actuation controller coupled to a communication bus. The electronic stability controller includes multiple wheel speed sensors (usually one per wheel) that determine a first vehicle speed. The occupancy restraint controller includes a vertical acceleration sensor to sense a vertical acceleration of the vehicle and a longitudinal acceleration sensor to sense a longitudinal acceleration of the vehicle. The actuation controller configured to determine a second vehicle speed using the vertical acceleration and the longitudinal acceleration of the vehicle, validate the second vehicle speed when the difference between the first vehicle speed and the second vehicle speed is less than a threshold; and use the first vehicle speed when the difference between the first vehicle and the second vehicle speed is greater than a threshold. In one example, the actuation controller uses the second vehicle speed to decelerate the vehicle when the electronic stability controller is disconnected from the communication bus. In another example, the actuation controller is further configured to receive a control signal (generated based on the second vehicle speed) from the driver assistance module to decelerate the vehicle. In another example, the actuation controller is further configured to determine a slope of the surface on which the vehicle is moving.

Another embodiment provides a method for determining a vehicle speed. The method includes determining, with a wheel speed sensor, a first vehicle speed. The method includes sensing, with a vertical acceleration sensor, a vertical acceleration for the vehicle. The method also includes sensing, with a longitudinal acceleration sensor, a longitudinal acceleration for the vehicle. The method includes determining a second vehicle speed using the vertical acceleration and the longitudinal acceleration for the vehicle. The method includes using the second vehicle speed when the difference between the first vehicle speed and the second vehicle speed is less than a threshold. The method also includes using the first vehicle speed when the difference between the first vehicle speed and the second vehicle speed is more than the threshold. The method includes retarding the vehicle, with an actuation controller, by applying one or more brakes of the vehicle based on the second vehicle speed when an electronic stability controller undergoes a catastrophic failure. In one example, the method includes receiving, with the actuation controller, a control signal from a driver assistance module. The control signal is generated based on the second vehicle speed. In one example, the method also includes determining, with the driver assistance module, a slope of the surface on which the vehicle is operating.

Other aspects of the invention will become apparent by consideration of the detailed description and accompanying drawings.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
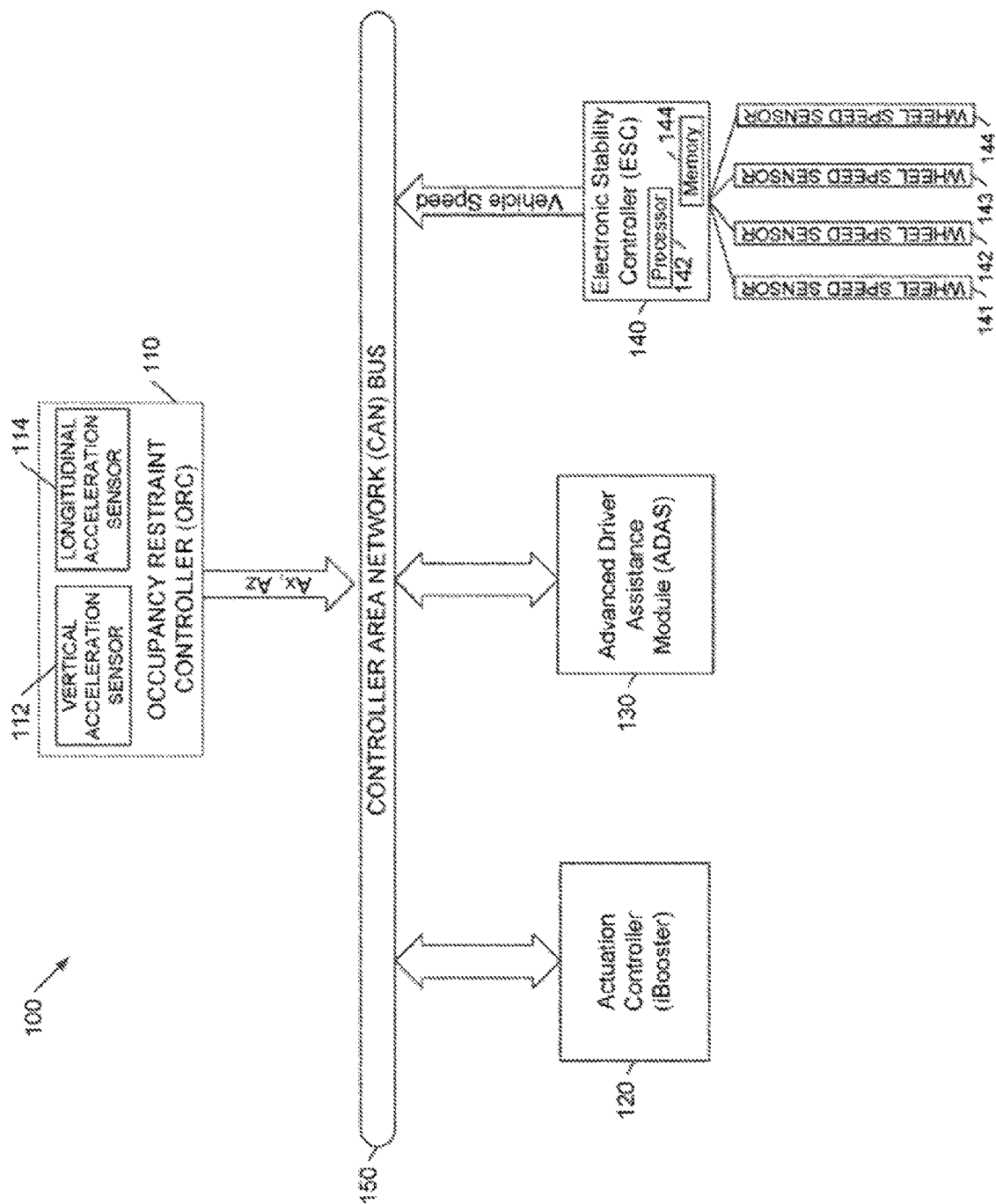
FIG. 1 is a block diagram of a system for determining vehicle speed in accordance with some embodiments.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Modern vehicle dynamic control systems, such as anti-locking breaking systems (ABS), electronic stability controller (ESC), advanced driver assistance module (ADAS) have improved the safety of vehicles. The performance of these dynamic control systems is reliant to some degree on the accuracy of various vehicle parameters, such as the vehicle velocity, which are often estimated or determined based on input from one or more vehicle sensors.

Automated and Semi-automated driving requires vehicle speed estimation in case of a catastrophic brake mode failure as the wheel speed sensors are typically attached to the brake module associated with an electronic stability controller (ESC). A back-up vehicle speed estimation may be performed using the vehicle's longitudinal acceleration ($A_x$) that can be integrated over time using a known initial velocity (for example, zero for a standstill vehicle). However, using longitudinal acceleration ($A_x$) to determine the vehicle speed may not be accurate due to the inclusion of a component associated with gravity when a vehicle is used in driving conditions that includes a slope (for example, during uphill/downhill driving). In one embodiment, data from a vertical acceleration sensor ($A_z$) along with $A_x$ may be used to eliminate the component due to gravity. This is further illustrated by the following equations.

$$A_x = A_x(\text{inertial}) +/- g^*(\text{Sin}(\theta)) \qquad (1)$$

The vertical acceleration sensor output $$A_z = g^*\text{Cos}(\theta) \qquad (2)$$

θ=Road slope angle

Combining (1) and (2) can eliminate the inertial component of the longitudinal acceleration.

$$A_x(\text{Inertial}) = A_x(\text{From Sensor}) +/- g^*\text{Sin}(\text{Inv Cos}(A_z/g)) \qquad (3)$$

From the $A_x$ (inertial) and initial known velocity, the current vehicle speed may be estimated by integrating $A_x$ with time.

$$V(t) = V(0) + \text{Integral}(A_x(t)dt)$$

FIG. 1 is a block diagram of system 100 for determining vehicle speed in accordance with some embodiments. System 100 includes an occupancy restraint controller (ORC) 110, an actuation controller 120 (for example, an iBooster or similar device including an electronic processor), an advanced driver assistance module (ADAS) 130 and an electronic stability controller 140 coupled to a communication network 150. The occupancy restraint controller 110 includes a longitudinal acceleration sensor 112 and a vertical acceleration sensor 114. The communication network 150 may be a CAN bus, a Flex-Ray bus or other communication arrangement. Also included in FIG. 1 are wheel speed sensors 141, 142, 143 and 144 coupled to the electronic stability controller 140. The electronic stability controller 140 operates to control the stability of the vehicle and includes a processor 142 and a memory 144. The memory 144 stores instructions that, when executed by the processor 142 control the operation of the electronic stability controller 140.

Figure 2:
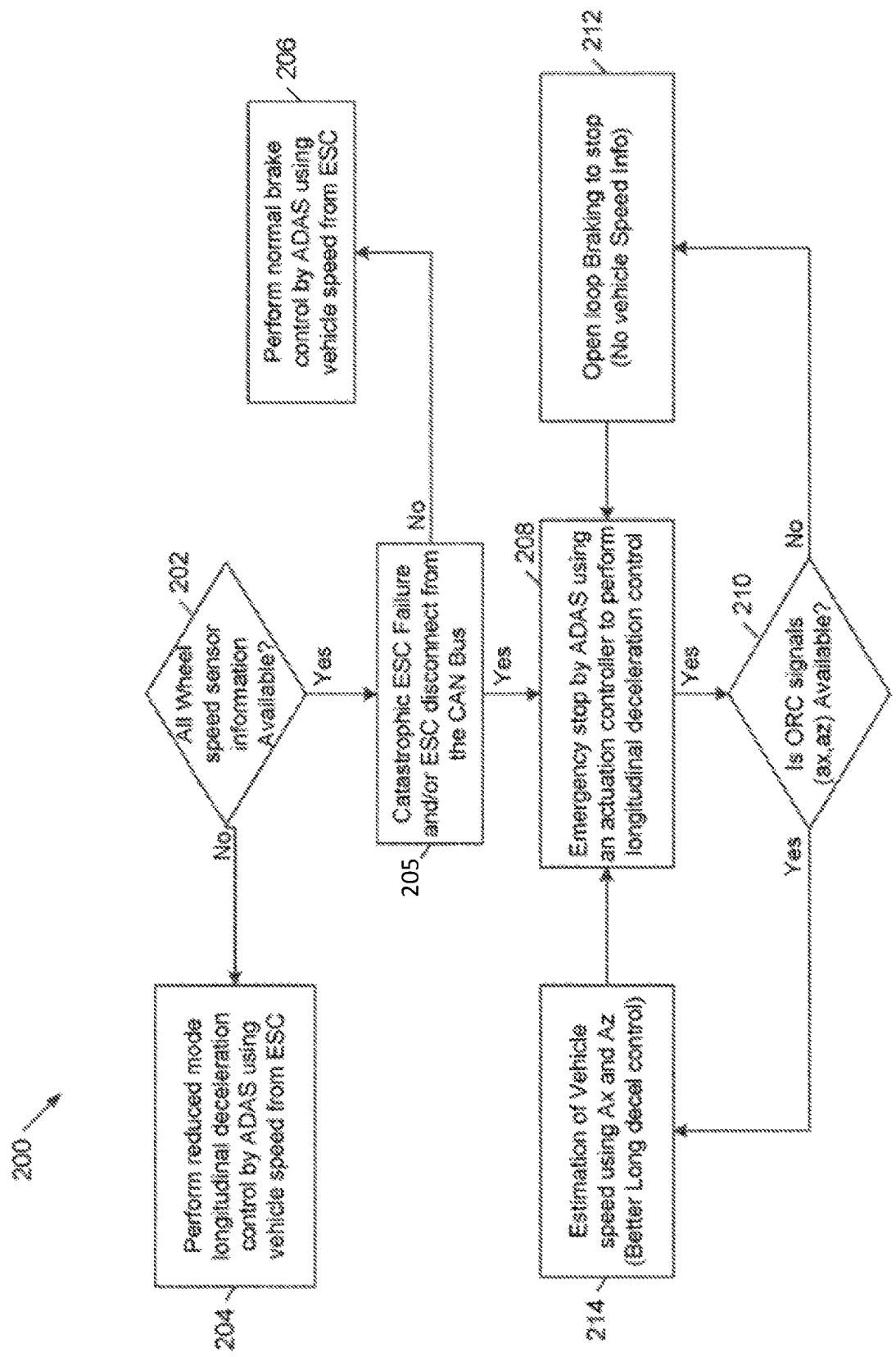
FIG. 2 is a flowchart illustrating a method for stopping a vehicle operating in an automated driving mode in accordance with some embodiments.

FIG. 2 is a flowchart 200 illustrating a method for stopping a vehicle operating in an automated driving mode in accordance with some embodiments. At block 202, the method 200 determines whether all-wheel speed sensor information is available. If the all-wheel sensor information is not available, the method 200 proceeds to block 204. At block 204, the method 200 includes performing a reduced mode longitudinal deceleration control by the advanced driver assistance module 130 using the vehicle speed determined using the electronic stability controller 140. When the all-wheel speed sensor information is available, the method 200 proceeds to block 205. At block 205, the method 200 includes determining whether a catastrophic failure has occurred in the electronic stability controller 140 and/or whether the electronic stability controller 140 is disconnected from the communication network. If a catastrophic failure of the electronic stability controller 140 has not occurred, the method 200 proceeds to block 206. At block 206, the method 200 includes performing normal brake control by the advanced driver assistance module (ADAS) using the vehicle speed received from the electronic stability controller 140. If a catastrophic failure of the electronic stability controller 140 has occurred or if the electronic stability controller 140 is disconnected from the communication network 150, then the method 200 proceeds to block 208. At block 208, the method 200 performs an emergency stop of the vehicle using an actuation controller 120 (or a smart brake actuator) associated with the advanced driver assistance module 130 by performing a longitudinal deceleration control. The method 200 proceeds further to block 210 where it is determined whether longitudinal and vertical acceleration sensors are available. At block 210, if it is determined that longitudinal and vertical sensors are available, then the method 200 proceeds to block 214. At block 214, the method 200 estimates the vehicle speed using $A_x$ and $A_z$ received from the longitudinal acceleration sensor 112 and the vertical acceleration sensor 114 to provide longitudinal deceleration control. At block 210, if it is determined that longitudinal and vertical acceleration sensors are not available, then the method 200 proceeds to block 212. At block 212, the method 200 provides open loop braking to retard or stop the vehicle without the presence of vehicle speed info.

Figure 3:
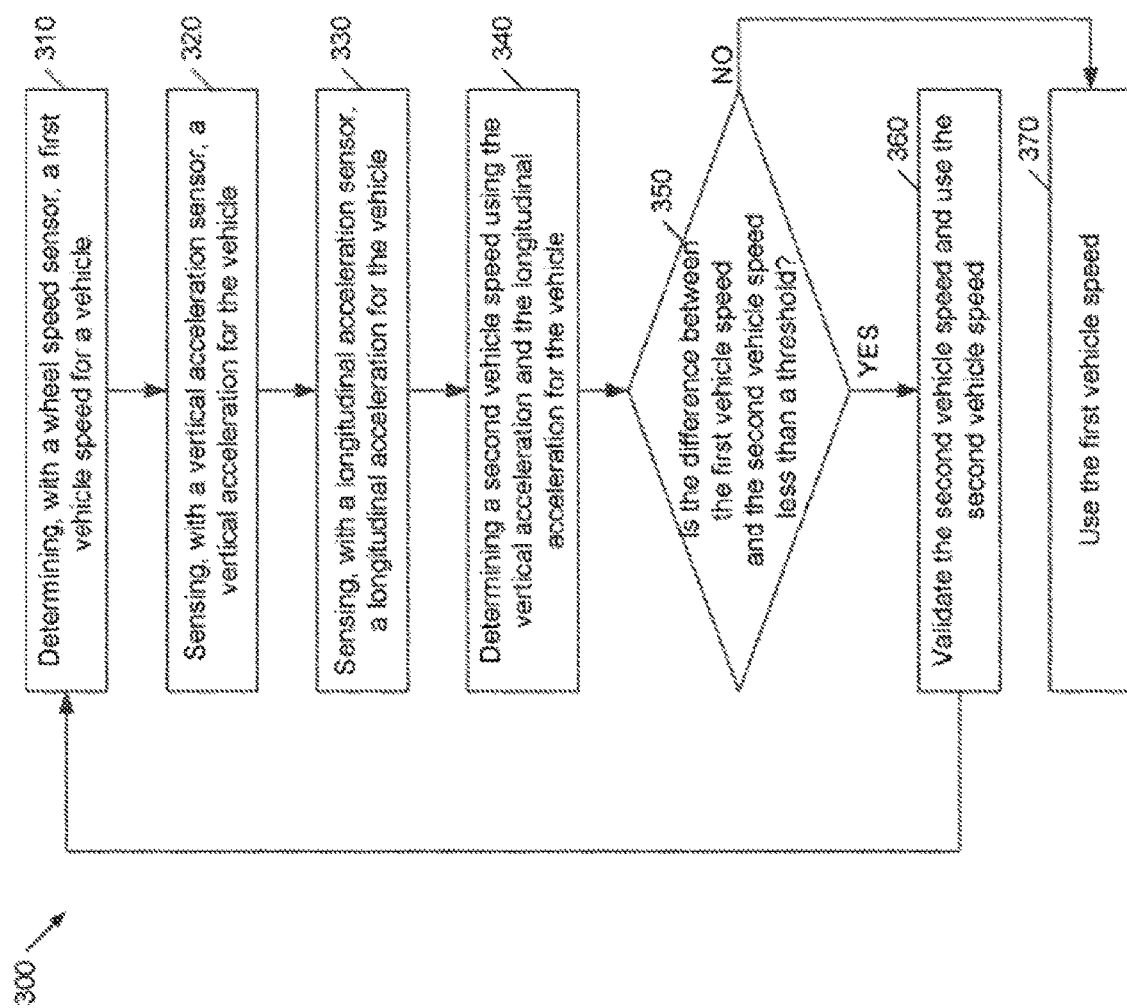
FIG. 3 is a flowchart illustrating a method of determining a vehicle speed using vertical and longitudinal acceleration sensors in accordance with some embodiments.

FIG. 3 is a flowchart 300 illustrating a method of determining a vehicle speed using vertical and longitudinal acceleration sensors in accordance with some embodiments. At block 310, the method includes determining, with a wheel speed sensor, the vehicle speed for a vehicle. In one embodiments, the vehicle speed is measured by one or more of the wheel speed sensors 141-144. At block 320, the method includes sensing, with a vertical acceleration sensor, a vertical acceleration ($A_z$) for the vehicle. In one embodiment, the vertical acceleration is measured using the vehicle acceleration sensor 112. At block 320, the method includes sensing, with a longitudinal acceleration sensor, a longitudinal acceleration for the vehicle. In one embodiment, the longitudinal acceleration is measured using the longitudinal acceleration sensor 114.

At block 340, the method includes determining a second vehicle speed using the vertical acceleration and the longitudinal acceleration for the vehicle. At block 350, the method determines whether the difference between the vehicle speed measured at block 310 and the vehicle speed determined at block 340 is less than a threshold amount (in other words, it is within an error margin). If the difference between the vehicle speed from the wheel speed sensors and that determined using the longitudinal and vertical acceleration sensors is not less than the threshold, then the method proceeds to block 370. At block 370, the method uses the vehicle speed determined by the wheel speed sensors. On the other hand, at block 350, if the difference between the vehicle speed from the wheel speed sensors and that determined using the longitudinal and vertical acceleration sensors is less than the threshold, then the method proceeds to block 360. At block 360, the method validates and uses the vehicle speed determined using the longitudinal and vertical acceleration sensors.

Thus embodiments of the invention provides, among other things, a system and method for vehicle speed calculations based on acceleration input can be used to control the vehicle to a safe spot in the event of a catastrophic failure of the electronic stability controller or a brake controller module.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments (for example, including components such as the electronic stability controller, advanced driver assistance module, actuation controller, occupancy restraint controller) may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

I claim:

1. A method of determining a vehicle speed of a vehicle, the method comprising:
   determining, with a wheel speed sensor, a first vehicle speed;
   sensing, with a vertical acceleration sensor, a vertical acceleration for the vehicle;
   sensing, with a longitudinal acceleration sensor, a longitudinal acceleration for the vehicle;
   determining a second vehicle speed using the vertical acceleration and the longitudinal acceleration for the vehicle;
   determining a difference between the first vehicle speed and the second vehicle speed;
   when the difference between the first vehicle speed and the second vehicle speed is less than or equal to a threshold, using the second vehicle speed; and
   when the difference between the first vehicle speed and the second vehicle speed is more than the threshold, using the first vehicle speed.

2. The method of claim 1, further comprising: retarding the vehicle using the second vehicle speed when an electronic stability controller undergoes a catastrophic failure.

3. The method of claim 2, further comprising: retarding the vehicle, with an actuation controller, by applying one or more brakes of the vehicle.

4. The method of claim 3, further comprising: receiving, with the actuation controller, a control signal from a driver assistance module, wherein the control signal is generated based on the second vehicle speed.

5. The method of claim 4, further comprising determining, with the driver assistance module, a slope of the surface on which the vehicle is operating.

\* \* \* \* \*